Oct. 13, 1925.　　　　　　　　　　　　　　　　1,557,500
P. NORDENFELT ET AL
MACHINE FOR AUTOMATICALLY APPLYING COVERS ON BOXES OR SIMILAR PACKINGS
Filed Oct. 20, 1923　　4 Sheets-Sheet 2
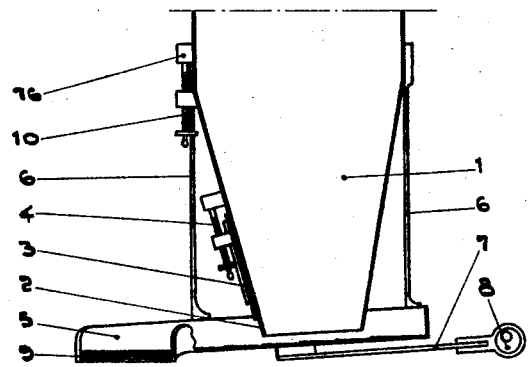
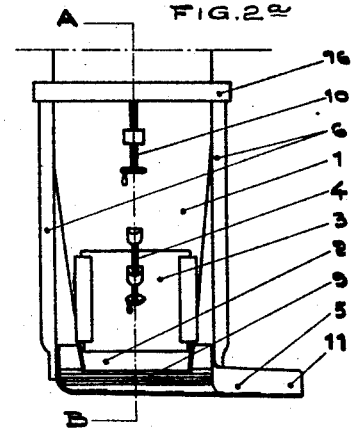
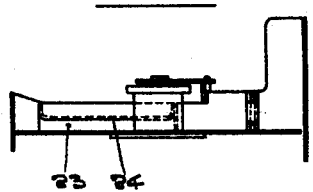
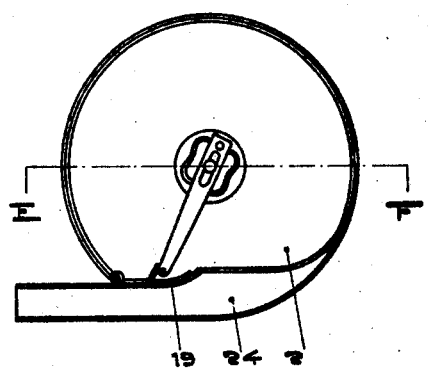
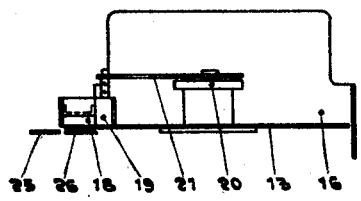
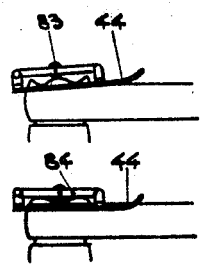
INVENTORS
PER NORDENFELT
EDVARD FRISK
BY
ATTORNEY

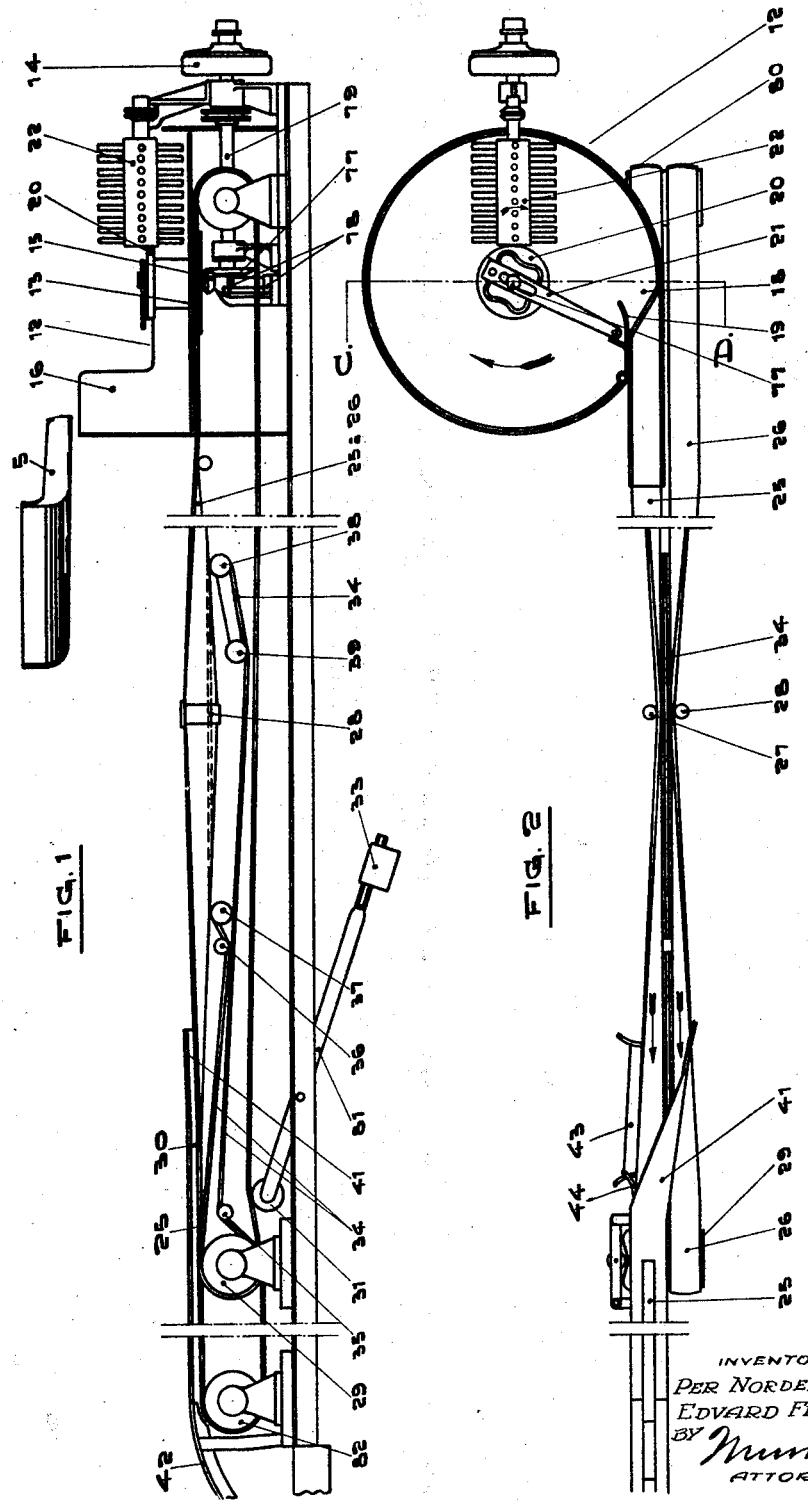

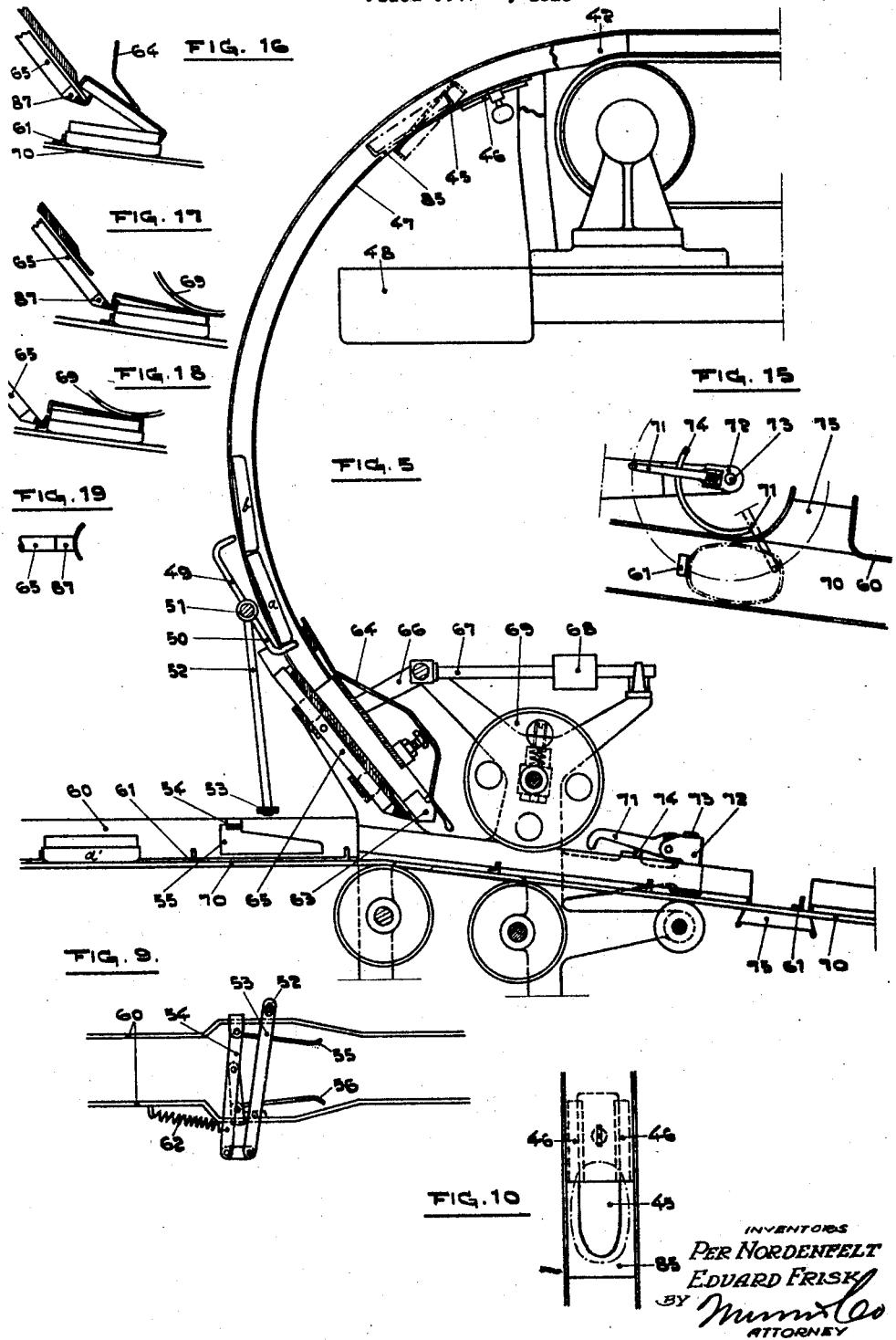

Oct. 13, 1925. 1,557,500
P. NORDENFELT ET AL
MACHINE FOR AUTOMATICALLY APPLYING COVERS ON BOXES OR SIMILAR PACKINGS
Filed Oct. 20, 1923 4 Sheets-Sheet 4

INVENTORS
PER NORDENFELT
EDVARD FRISK
BY
ATTORNEY

Patented Oct. 13, 1925.

1,557,500

UNITED STATES PATENT OFFICE.

PER NORDENFELT AND EDVARD FRISK, OF STOCKHOLM, SWEDEN, ASSIGNORS TO AKTIEBOLAGET FORMATOR, OF STOCKHOLM, SWEDEN, A CORPORATION.

MACHINE FOR AUTOMATICALLY APPLYING COVERS ON BOXES OR SIMILAR PACKINGS.

Application filed October 20, 1923. Serial No. 669,802.

*To all whom it may concern:*

Be it known that we, PER NORDENFELT and EDVARD FRISK, subjects of the King of Sweden, residing at, respectively, Ostermalmsgatan 44, Stockholm, Sweden, and Luntmakaregatan 19, Stockholm, Sweden, have invented certain new and useful Improvements in Machines for Automatically Applying Covers on Boxes or Similar Packings, of which the following is a specification.

This invention relates to a machine for automatically applying covers on boxes, particularly pasteboard boxes or similar packings.

One form of embodiment of a machine according to the invention is illustrated in the annexed drawings.

Fig. 1 is a side view of the conveyer and cover turning device, the separating device and the feeder device, some parts being shown in section. Fig. 2 is a plan view of the cover turning device.

Figure 6:
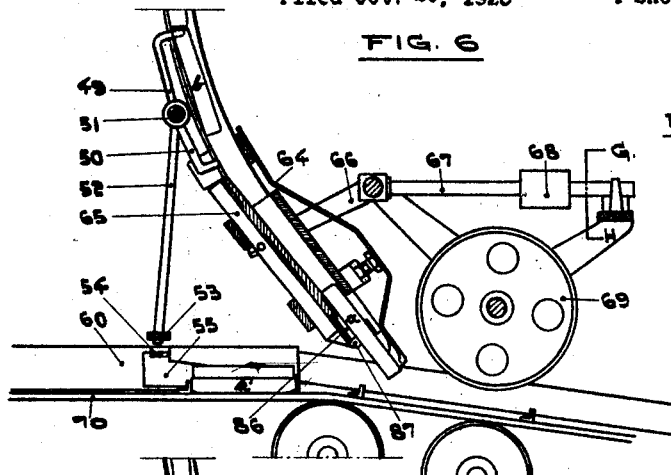
Figure 7:
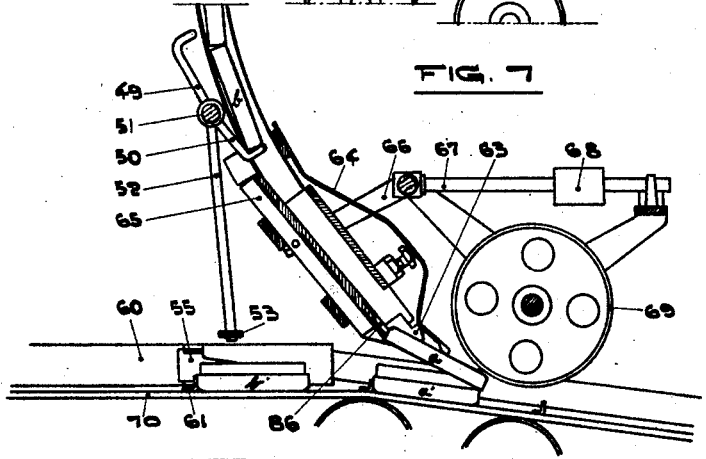
Figure 8:
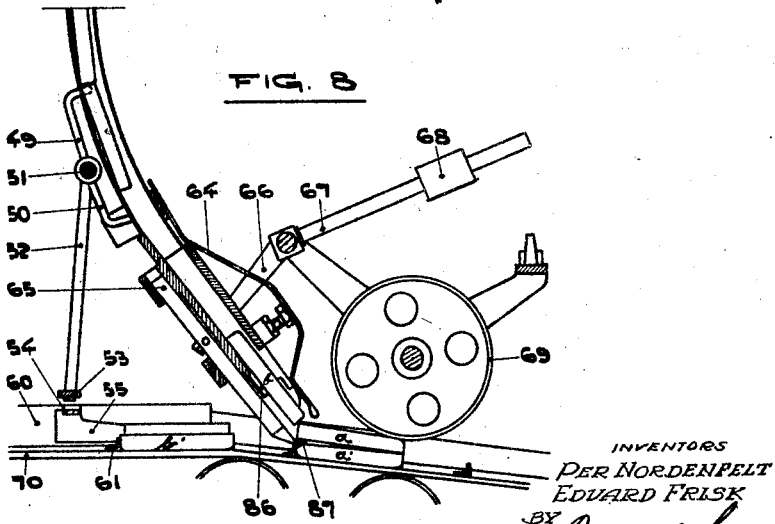

Figure 2ª is a side view of the cover storing drum with a control device for the covers. Fig. 3 is a section along the line A—B of Fig. 2ª. Fig. 4 shows a form of embodiment of the separating device. Fig. 5 shows the cover channel, the cover applying device, viewed from the side, and the device for controlling the supply of covers to the cover applying device. Figs. 6 to 8 illustrate the manner of operation of said controlling device and cover applying device. Fig. 9 is a plan view of parts of the cover channel and the removing device. Fig. 10 shows a plan view of a detail placed at the upper part of the cover channel. Figs. 11 and 12 are side views of certain parts of the feeding devices according to Figs. 2 and 4 respectively. Figs. 13 and 14 illustrate in different positions a detail of the conveyer and cover turning device. Fig. 15 shows a detail of the cover turning device. Figs. 16 to 18 illustrate in different positions certain parts of the cover applying device. Fig. 19 shows one of said parts, viewed from above.

Figure 20:

Figure 20 is a section on line G—H in Figure 6.

The finished covers are moved down into a feeding device, consisting of a drum, from which they are fed in the desired number to an apparatus, here called the separating device, which separates the covers in such a manner that they will be fed one after the other on a conveyer device, which transports the covers to a channel the cover channel, which in turn conveys the covers to the cover applying device, located at a place, where the cover channel and a channel, in which the boxes are fed, meet with one another. The said conveying device is so arranged that all covers, whatever their location on the conveying device may be at the starting end, always will be turned in the same direction at the delivery end of said device. Provided at the cover channel is a device for controlling the supply of the covers to the cover applying device arranged at the delivery end of the channel, so that the covers will be supplied to the said applying device according as the boxes are fed in a channel extending below the cover applying device.

The covers are stored in a finished state in the drum 1, Figs. 1 and 3, extending from the floor, where they are made, to a lower floor, where the machine in question is mounted. The drum is provided at its lower part with a delivery opening for the covers, which is adjustable by means of a shutter 3 movable up and down by means of the screw device 4, so as to control, when required, the height of the delivery opening for the covers.

After having passed the delivery opening 2 the covers come out on the table 5 carried by the suspensions 6 and obtaining by the connecting rod 7, in turn driven by the eccenter disk 8, a reciprocating movement and, thus, working as a usual hopper. In order to obtain a safe feeding of the covers on the table 5, the bottom of said table is provided with stepped parts 9, and, besides, the suspensions 6 are secured, at the one side, to a beam 76, capable of being raised and lowered by means of a screw 10 entering a nut secured to the drum, so that by turning the screw the table may be more or less tilted.

The covers are fed through the delivery opening 11 of the hopper 5 into a separating receptacle 12, Figs. 1 and 2, the bottom of which, here called the separating table, consists of a circular disk 13, the shaft 77 of which is rotatably mounted in bearings 78 on the frame and which is held in a constant rotation with suitable speed by means of the belt pulley 14, the shaft 79 and bevel gear 15. According as the covers drop on the separating table, they partake in the rotary motion of the bottom 13 and are thrown by the centrifugal force against the rim 16 of the receptacle 12. Provided in the said rim is a discharge opening 18 for the covers, the one side wall 19 of which has an oscillating movement performed by the cam disk 20 secured to the shaft 77 and the arm 21 and having for its object to prevent stopping up of the covers in front of the opening 18. In order to prevent that two or more covers, which have at an earlier state been clamped together, shall pass away in said clamped condition, a roll 22 is arranged across the path of the covers on the separating table. The roll 22 is provided at its circumference with pins of wood or the like and rotates in the direction of the arrow Fig. 2, so that the pins move in their lower position in a direction opposite to that of the covers passing below the roll, The distance between the lower part of the roll and the separating table 13 is so great that a cover lying on the table 13 may easily pass, however not so great that two or more covers, lying the one within the other, can pass simultaneously, but such covers are thrown back by the pins, until they are separated and can pass below the roller one after the other. For the sake of safety the discharge opening 18 is provided with a roof at the same height as the lower part of the roll, and on account hereof covers clamped together as above mentioned and which may, at an abundant supply, possibly be thrown over the roll, cannot pass into the opening.

Instead of the roll a device according to Fig. 4 may be used. That part of the wall of the receptacle in which the discharge opening 23 is made, has, as apparent from the drawing, such a position and such form that covers, which due to the above circumstances cannot pass under the roof 24, proceed the rotation, until they have been separated and can pass away.

The covers are now separated in such manner as to pass one after another to the conveyer 25, Fig. 2. However, they do not yet lie uniformly having the bottom turned in the same direction up or down, but are in this respect disordered. The object of the conveyer is to turn all covers uniformly, and this is obtained in the manner described below.

As apparent from Figs. 1 and 2, the conveyer consists of two endless bands or belts, one 25 of which is longer than the other 26. Both of said belts move in the direction of the arrow, and their driving pulley 80 obtains its rotary motion from the shaft of the separating table 13, so that the belts will be driven in a certain relation to the movement of the table. The front part of the belts, measured from the opening 18, lies horizontally; the belts obtain, however, later, due to the rollers 27, 28, gradually a vertical or substantially vertical position and, then again a horizontal position approximately at the pulley 29 for the belt 26. The belts are held, independently of eventual extension, at a normal stress by the rollers 31 bearing against the under side of the lower parts of the belts and pressed upwards through counter weights 33, the rollers being provided at the one arm and the counter weights at the other arm of a lever 81 connected to the frame. Moving between the belts is a cord 34 or the like driven from the disk 29. The cord is so applied that it, when the belts are in the vertical position, lies just between the belts at their lower edge. The cord is held in the proper position by the guide rollers 35—38 and in a stretched condition by the roller 39 provided at the free end of a turntable arm. When now the covers pass from the separating table onto the belt 25, they are moved away with said belt and brought to obtain a more and more vertical position according to the position of the belt, until they, apart from the circumstance if they are turned right or not, obtain at the middle part of the belt, i. e., at the rollers 27 and 28, a vertical position, the covers being here carried by the cord 34 and held in their upright position by the belts, the space between the belts being at 27 and 28 great enough to take a cover.

Obviously, the covers are heavier at the bottom side and, consequently, the belt at that side prevents the upright covers from falling or tilting. When now, as before mentioned, the belts turn back to the horizontal position, the covers are tilted in such manner that each cover goes along with that belt, which earlier prevented it from tilting, and will rest on said belt with the bottom turned down. Thus, the covers, which were from the beginning turned wrong, will go along with the one belt, whereas the covers, which were from the beginning turned right, will go along with the other belt. Then, when all covers are moved together on the belt 25 by means of the guide 41, they take again their place the one after the other, but are now all turned right.

The belt 25 has a somewhat greater extension than the adjacent belt 26, in that the end pulley 82 for the belt 25 lies at a greater distance from the pulley 80 than does the end pulley 29, and the said extended part of the belt 25 forms a bottom of a receiver 30, which the covers have to pass before entering the cover channel, said arrangement being of importance in case of any inaccuracy should occur at the supply or elsewhere during the travel. Located at the entering end of the receiver is an oscillating wall 44 serving to facilitate the passage into the receiver. The oscillating movement is obtained from the pulley 29, the one end surface of which has an irregular shape and acts by means of a roller 83 on a swingable arm 84 connected with the wall 44. Figs. 13 and 14 show two different positions of the device. Besides, a wide channel 43 is provided at the side of the belt 25, where the covers, in case of the receiver has been filled due to unnormal supply, are automatically moved towards the side and drop into a receptacle, until room is obtained in the receiver for more covers.

From the receiver the covers are moved further into the channel 42 Figs. 5–8, at the lower part of which the application of the covers is performed. The channel has a semi-circular extension, in order that the covers, which at its upper part have the bottom turned down, will obtain an opposite position at the lower part, i. e., have the bottom turned up. As it has proved that one cover or another, due to deformation or crushing, may come to the cover channel with its bottom turned wrong, i. e., upwards, it is necessary to have those covers removed. This is obtained by providing an opening 85 in the bottom 47 at the upper part of the channel 42, said opening being partly covered by a tongue 45, as shown in Figs. 5 and 10. The tongue is adjustable between guides 46 and is placed in such relation to the opening 85 in the bottom 47 of the channel that a cover passing with its bottom turned down will, thanks to its support against the tongue, move over the opening, while a cover having its bottom turned up does not obtain any support against the tongue, but drops, as apparent from the figure, through the opening into a receptacle 48.

In order that the weight of all covers resting in the channel shall not act impeditively on the cover applying mechanism located at the lower end of the channel, said channel is provided with a step by step mechanism, which allows but one cover at a time to pass to the cover applying mechanism.

The construction and manner of operation of said device appear from Figs. 5 to 9. Provided at that side of the channel, towards which the covers turn their openings, is a pawl swingable about the axis 51, the arms 49 and 50, respectively, of said pawl being capable of engaging with their bent ends into the channel 42. The pawl is by means of the rod 52 connected to the lever system 53—56, Fig. 9, mounted on the channel 60, in which the boxes adapted for the covers pass one at a time moved forward by the conveyer belt 70 by means of the carriers 61. The arms 55, 56 arranged longitudinally in the channel and between which the boxes pass, are held by the spring 62 in the position shown in Fig. 9, and the arms 49, 50 of the pawl are, then, located as apparent from Fig. 5, i. e., the lower arm of the pawl supports from beneath a cover $a$ coming down and holds it at rest. When the box $a^1$ adapted for that cover reaches the arms 55, 56, Fig. 9, they are caused to separate by the box, whereby the arms 49, 50 are actuated by the levers 53, 54 and the rod 52 and release the said cover $a$ resting on the arm 50. As, however, the arm 49 is longer than the arm 50, the former has already, before the latter has wholly released the cover $a$, engaged the next cover $b$, so that this, when the cover $a$ continues to move down to the end of the channel, will be at rest on the arm 49 Fig. 6. When the box $a^1$ has wholly passed the arms 55, 56, the latter return to their initial position, whereby the cover $b$ hanging on the arm 49 will be released and drops down against the arm 50 and so on Figs. 7 and 8.

After having been released the cover $a$ continues to move down into the cover applying apparatus, which applies it on the box $a^1$. The cover will be arrested between two yielding plates 63, one of which is visible in Figs. 5 and 7, in such position, as to be caught by the rim of the box $a^1$ and caused to follow the box Figs. 6 and 7. Thereby, a spring 64 secured to the channel presses down on the rear part of the cover, so that said part is caused to move down into a recess 86 in the bottom of the channel and engages the lower shoe-horn shaped part 87 of a piston 65, movably mounted at the outside of the channel and held in its upper position by a lever 66, 67 and a counter-weight 68. When now the cover is brought forward by the box on the transport belt 70, it carries the piston 65 with it and is held pressed against said piston by the spring 64 and later Fig. 8 by the roller 69. The horn 87 of the piston guides the rear part of the cover, so that it will exactly clasp round the corresponding part of the rim of the box Figs. 16 to 18, and, then, the piston returns, as apparent from Fig. 8, to its initial position by action of the weight or the lever 66, 67. Then, the box having the cover applied to it passes below the roller 69, the cover being, thereby, positively pressed on to the box due to the pressure of the said roller.

In order to prevent that a box, which for any reason has passed the cover applying apparatus without any cover being applied thereto, shall continue to move in said condition to a following machine, a device is provided for removing such boxes. Said device consists of an arm 71, Figs. 5 and 15, pivotally mounted at 72, so that its free end can move in the vertical plane, said arm being caused to make one revolution in the horizontal plane about the axis 73 for each pocket on the belt passing by it. The arm 71 is held in a raised position by the guide 74, until it when rotating comes just above the belt, when it will be lowered so as to grasp the box with its end bent 90° in the downward direction. If the box be provided with a cover, the arm 71 will but smoothly slide over the cover without changing the position of the box on the belt. If, on the other hand, the box has no cover, the arm will move down into the box and causes the box to partake in its turning movement, until the box slides off the belt and drops down into a channel 75 located at the side of the belt, from where the box will later be moved to a receiver.

The above described and shown devices for separating the covers, for feeding them down into the separating apparatus, and for conveying and turning them into the right position may also, preferably, be used for the boxes, i. e. it lies, obviously, within the scope of the invention, that the boxes may also be exposed to same procedure, as do the covers, before entering the box channel. Further, the device shown may, obviously, be modified in many ways without departing from the spirit of the invention.

Thus, the said device 71—75 may, for instance, also be applied at a suitable place along the conveyer belt for the covers, so that a cover turned wrong will be moved away and, thus, a double safety obtained that wrong turned covers will be removed. As apparent from the drawing, also the device 45, 46, 47 and 85 performs such an action.

Similarly, the said devices may each or together, to a certain extent, substitute the said cover turning device and, further, said latter device may, obviously, be used independently of the devices 71—75, 45, 46, 47, 85.

However, it is most suitable to use in combination with a cover turning device at least one device for removing wrong turned covers, while otherwise in the one case it is necessary to control the machine more carefully in order to remove covers, which, though they have passed the cover turning device, lie wrong, and in the other case a too great number per cent of the covers are removed.

What we claim as new and desire to secure by Letters Patent of the United States is:—

1. In a machine for applying covers on boxes, the combination with a device, called the separating device, for separating the covers and feeding them one after the other from a receptacle to a conveyer device for moving the covers to a channel leading to the cover applying place, of a device which performs that the covers when coming to the place where they are applied to the boxes turn all the same side up, and which consists of conveying members which order the covers during the conveying so that all covers turn the same side up, and a device for applying the covers to the boxes moved forward below the delivery end of the cover channel.

2. In a machine for applying covers on boxes, the combination with a device, called the separating device, for separating the covers and feeding them one after the other from a receptacle to a conveyer device for moving the covers to a channel leading to the cover applying place, of a device which performs that the covers when coming to the place where they are applied to the boxes turn all the same side up, and which consists of conveying members which order the covers during the conveying so that all covers turn the same side up, further of a device by which covers inadvertently turned wrong are moved out of the conveying path, and finally a device for applying the covers to the boxes moved forward below the delivery end of the cover channel.

3. In a machine for applying covers on boxes, the combination of a device, called the separating device, for separating the covers and feeding them one after the other from a receptacle to a conveyer device for moving the covers to a channel leading to the cover applying place, said feeding device consisting of a receiver having a rotary bottom and a discharge opening for the covers in its rim, of a device which performs that the covers, when coming to the place where they are applied to the boxes, turn all the same side up, and which consists of conveying members which order the covers during the conveying so that all covers turn the same side up, and a device for applying the covers to the boxes moved forward below the delivery end of the cover channel.

4. In a machine for applying covers on boxes, the combination of a device, called the separating device, for separating the covers and feeding them one after the other from a receptacle to a conveyer device for moving the covers to a channel leading to the cover applying place, said feeding device consisting of a receiver having a rotary bottom and a discharge opening for the covers in its rim, an oscillating wall being provided at the one side of said discharge opening to prevent stopping up of the covers in front of the said discharge opening, said wall obtaining its oscillating motion by means of a cam disk provided on the shaft of said bottom and by a lever cooperating with said cam disk, a device which performs that the covers when coming to the place where they are applied to the boxes turn all the same side up, and which consists of conveying members which order the covers during the conveying so that all covers turn the same side up, and a device for applying the covers to the boxes moved forward below the delivery end of the cover channel.

5. In a machine for applying covers on boxes, the combination of a device, called the separating device, for separating the covers and feeding them one after the other from a receptacle to a conveyer device for moving the covers to a channel leading to the cover applying place, said feeding device consisting of a receiver having a rotary bottom and a discharge opening for the covers in its rim, an oscillating wall being provided at the one side of said discharge opening to prevent stopping up of the covers in front of the said discharge opening, said wall obtaining its oscillating motion by means of a cam disk provided on the shaft of said bottom and by a lever cooperating with said cam disk, a device which performs that the covers when coming to the place where they are applied to the boxes turn all the same side up, and which consists of conveying members which order the covers during the conveying so that all covers turn the same side up, and a device for applying the covers to the boxes moved forward below the delivery end of the cover channel, the provision of a rotary roller disposed above said rotary bottom, said roller being provided with pins at its circumference and the lower part of said roller lying at such a distance from said bottom that a single cover may unstopped pass under the roller, whereas two covers clamped together will be thrown back by the roller.

6. In a machine for applying covers on boxes, the combination of a device, called the separating device, for separating the covers and feeding them one after the other from a receptacle to a conveyer device for moving the covers to a channel leading to the cover applying place, said feeding device consisting of a receiver having a rotary bottom and a discharge opening for the covers in its rim, an oscillating wall being provided at the one side of said discharge opening to prevent stopping up of the covers in front of the said discharge opening, said wall obtaining its oscillating motion by means of a cam disk provided on the shaft of said bottom and by a lever cooperating with said cam disk, a device which performs that the covers when coming to the place where they are applied to the boxes turn all the same side up, and which consists of conveying members which order the covers during the conveying so that all covers turn the same side up, and a device for applying the covers to the boxes moved forward below the delivery end of the cover channel, the provision of a rotary roller disposed above said rotary bottom, said roller being provided with pins at its circumference and the lower part of said roller lying at such a distance from said bottom that a single cover may unstopped pass under the roller, whereas two covers clamped together will be thrown back by the roller, the roof of the discharge opening lying at the same height from the bottom as does the lower part of the roller.

7. In a machine for applying covers on boxes, the combination of a device, called the separating device, for separating the covers and feeding them one after the other from a receptacle to a conveyer device for moving the covers to a channel leading to the cover applying place, said feeding device consisting of a receiver having a rotary bottom and a discharge opening for the covers in its rim, of a device which performs that the covers, when coming to the place where they are applied to the boxes, turn all the same side up, and which consists of conveying members which order the covers during the conveying so that all covers turn the same side up, and a device for applying the covers to the boxes moved forward below the delivery end of the cover channel, and means for preventing two or more covers clamped together to pass the discharge opening in the said condition, said means consisting therein that that part of the rim, in which the discharge opening is provided, is so located and formed that two clamped covers may easily slide along said part of the rim until they have been separated.

8. A machine for ordering covers, consisting of a receptacle for the covers, a device for separating the covers so as to feed them one after the other from said receptacle, means for conveying the covers from a separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, located, preferably, just between said end and the delivery end, to successively turn their supporting surfaces towards each other, until said surfaces at said point obtain a vertical position, and, finally, when passing the path between said point and the delivery end to successively return to the horizontal position.

9. A machine for ordering covers, consisting of a receptacle for the covers, a device for separating the covers so as to feed them one after the other from said receptacle, means for conveying the covers from a separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, located, preferably, just between said end and the delivery end, to successively turn their supporting surfaces towards each other, until said surfaces at said point obtain a vertical position, and, finally, when passing the path between said point and the delivery end to successively return to the horizontal position, a support for the covers being provided along that path, where the band surfaces obtain the said vertical position, and at the lower edge of the bands.

10. A machine for ordering covers, consisting of a receptacle for the covers, a device for separating the covers so as to feed them one after the other from said receptacle, means for conveying the covers from a separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, located, preferably, just between said end and the delivery end, to successively turn their supporting surfaces towards each other, until said surfaces at said point obtain a vertical position, and, finally, when passing the path between said point and the delivery end to successively return to the horizontal position, a support for the covers being provided along that path where the band surfaces obtain the said vertical position, and at the lower edge of the bands, said support consisting of a cord or the like running in the same direction as the bands and located at the lower edges of the bands.

11. A machine for ordering covers, consisting of a receptacle for the covers, a device for separating the covers so as to feed them one after the other from said receptacle, means for conveying the covers from a separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, located, preferably, just between said end and the delivery end, to successively turn their supporting surfaces towards each other, until said surfaces at said point obtain a vertical position, and, finally, when passing the path between said point and the delivery end to successively return to the horizontal position, a guide being provided at or approximately at that place, where the bands have again obtained a horizontal position, said guide being adapted to cause the covers on the one band to move to the other band, so that but one of the bands delivers the covers to the desired position.

12. A machine for applying covers on boxes, having a receptacle for the covers, a device for separating the covers so as to feed them one after the other from said receptacle, means for conveying the covers from the separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, located, preferably, just between said end and the delivery end, to successively turn their supporting surfaces towards each other, until said surfaces at said point obtain a vertical position, and, finally, when passing the path between said point and the delivery end to successively return to the horizontal position, the one band delivering the covers to a channel which conveys the covers to the boxes and extending at the delivery end past the other band, the delivery end of said first-mentioned band forming a bottom of a receiver for the covers, in which the covers are arranged correctly in a row, before entering the channel.

13. A machine for applying covers on boxes, having a receptacle for the covers, a device for separating the covers so as to feed them one after the other from said receptacle, means for conveying the covers from the separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, preferably, just between said end and the delivery end, to successively turn their supporting surfaces towards each other, until said surfaces at said point obtain a vertical position, and, finally, when passing the path between said point and the delivery end to successively return to the horizontal position, the one band delivering the covers to a channel which conveys the covers to the boxes and extending at the delivery end past the other band, the delivery end of said first-mentioned band forming a bottom of a receiver for the covers, in which the covers are arranged correctly in a row, before entering the channel, an oscillating wall being provided at the charging opening of the said receiver, the oscillating movement of said wall being adapted to facilitate the entering of the covers into the receiver.

14. A machine for applying covers on boxes, having a receptacle for the covers, a device for separating the covers so as to feed them one after the other from said receptacle, means for conveying the covers from the separating device to a desired point and for regulating the covers in such manner that all covers turn the same side up, said means consisting of two endless bands placed side by side and running in the same direction and being so guided as to have at the receiving end their supporting surfaces running in the horizontal plane, then, when passing the path lying between the receiving end and a certain point, located, preferably, just between said end and the delivery end, to successively turn their supporting surfaces towards each other, until said surfaces at said point obtain a vertical position, and, finally, when passing the path between said point and the delivery end to successively return to the horizontal position, the one band delivering the covers to a channel which conveys the covers to the boxes and extending at the delivery end past the other band, the delivery end of said first-mentioned band forming a bottom of a receiver for the covers, in which the covers are arranged correctly in a row, before entering the channel, an oscillating wall being provided at the charging opening of the said receiver, the oscillating movement of said wall being adapted to facilitate the entering of the covers into the receiver, a wide lateral channel being provided at the side of the first-named band and close to the charging opening of said receiver, excess covers being at a great supply of covers to the receiver moved onto said channel and down into a receptacle or the like.

15. A machine for ordering covers, consisting of a receptacle for the covers, a device for separating the covers, so as to feed them one after the other from said receptacle, a device for controlling the supply of covers to the separating device, said controlling device consisting of a drum for storing the covers located at a greater height than the separating device and having a discharge opening, the bottom of said drum being formed as a reciprocating table, a so-called hopper, on the part of which extending beyond the lower end of the drum the covers coming out of said opening are fed and the discharge of which lies above the separating device.

16. A machine for ordering covers, consisting of a receptacle for the covers, a device for separating the covers, so as to feed them one after the other from said receptacle, a device for controlling the supply of covers to the separating device, said controlling device consisting of a drum for storing the covers located at a greater height than the separating device and having a discharge opening, the bottom of said drum being formed as a reciprocating table, a so-called hopper, on the part of which extending beyond the lower end of the drum the covers coming out of said opening are fed and the discharge of which lies above the separating device, characterized by the size of the discharge opening being adjustable by means of a shutter.

17. A machine for ordering covers, consisting of a receptacle for the covers, a device for separating the covers, so as to feed them one after the other from said receptacle, a device for controlling the supply of covers to the separating device, said controlling device consisting of a drum for storing the covers located at a greater height than the separating device and having a discharge opening, the bottom of said drum being formed as a reciprocating table, a so-called hopper, on the part of which extending beyond the lower end of the drum the covers coming out of said opening are fed and the discharge of which lies above the separating device, characterized by the bottom of the reciprocating table being stepped.

18. A machine for ordering covers, consisting of a receptacle for the covers, a device for separating the covers, so as to feed them one after the other from said receptacle, a device for controlling the supply of covers to the separating device, said controlling device consisting of a drum for storing the covers located at a greater height than the separating device and having a discharge opening, the bottom of said drum being formed as a reciprocating table, a so-called hopper, on the part of which extending beyond the lower end of the drum the covers coming out of said opening are fed and the discharge of which lies above the separating device, characterized by the reciprocating table being hinged by means of suspensions on a stationary part.

19. A machine for ordering covers, consisting of a receptacle for the covers, a device for separating the covers, so as to feed them one after the other from said receptacle, a device for controlling the supply of covers to the separating device, said controlling device consisting of a drum for storing the covers located at a greater height than the separating device and having a discharge opening, the bottom of said drum being formed as a reciprocating table, a so-called hopper, on the part of which extending beyond the lower end of the drum the covers coming out of said opening are fed and the discharge of which lies above the separating device, characterized by the reciprocating table being hinged by means of suspensions on a stationary part, said suspension device being adjustable, so as to cause the table to obtain the desired inclination.

20. In a machine for applying covers on boxes, the combination with a device, called the separating device, for separating the covers and feeding them one after the other from a receptacle to a conveyer device for moving the covers to a channel leading to the cover applying place, of a device which performs that the covers when coming to the place where they are applied to the boxes turn all the same side up, and which consists of conveying members, which order the covers during the conveying so that all covers turn the same side up, said channel having at its receiving end a horizontal position and extending, then, downwards in a curved form, so that the covers, which turn the bottom downwards at the receiving end of the channel, will obtain an inclined position having the bottom turned upwards at the delivery end of the channel.

21. In a machine for applying covers on boxes, the combination with a device, called the separating device, for separating the covers and feeding them one after the other from a receptacle to a conveyer device for moving the covers to a channel leading to the cover applying place, of a device, which performs that the covers when coming to the place where they are applied to the boxes turn all the same side up, and which consists of conveying members, which order the covers during the conveying so that all covers turn the same side up, said channel having at its receiving end a horizontal position and extending, then, downwards in a curved form, so that the covers, which turn the bottom downwards at the receiving end of the channel, will obtain an inclined position having the bottom turned upwards at the delivery end of the channel, characterized by the curved part of the channel being provided at its upper end with an opening covered partly by a tongue having such a size in relation to the opening that a cover having its bottom turned down by resting against the tongue will pass over the opening, while a cover having its bottom turned up will drop through the opening.

22. In a machine for applying covers on boxes, the combination with a device, called the separating device, for separating the covers and feeding them one after the other from a receptacle to a conveyer device for moving the covers to a channel leading to the cover applying place, of a device which performs that the covers when coming to the place where they are applied to the boxes turn all the same side up, and which consists of conveying members which order the covers during the conveying so that all covers turn the same side up, and a device for applying the covers to the boxes moved forward below the delivery end of the cover channel, and a device for controlling the sliding down of the covers to the delivery end of the channel in accordance with the feeding of the boxes, said device consisting, for one thing, of a double-armed lever pivotally mounted at the channel and forming a pawl, the ends of said lever engaging alternately the cover channel and arresting one cover and releasing the preceding one, and, for the other, of a device actuated by the boxes at their feeding in the box channel, said device being so connected to the lever that at each time when a box passes the said device the lever releases, i. e. causes a cover to drop down to the delivery end of the cover channel.

23. A machine according to claim 22, characterized by the said device actuated by the boxes consisting of two arms provided in the box channel and connected to the lever by a suitable lever system, the boxes being caused to pass between said arms, the ends of which turned to the delivery end of the box channel being normally held, for instance by spring action, at a distance from each other, which is less than the width of the boxes, so that the arms are separated when being passed by a box, and, thereby, turn the lever from the one to the other limit position.

24. In machines for applying covers on boxes, the combination of means for conveying the covers one after the other to a channel leading to the cover applying place, means for applying the covers to the boxes fed forwards below the delivering end of the said channel, said means comprising a piston movable along the lower end of the channel, the lower end of said piston being provided with an abutment or the like, preferably formed as a shoe horn, which approximately at that time when the fore part of the cover has been brought to engage the fore part of the rim of the box, is grasped by the rear edge of the cover, so that, in moving the cover forwards together with the box, the piston is first moved downwards, thereby guiding the rear part of the cover when pressing said cover onto the box, and then released so as to return to its initial position.

25. In machines for applying covers on boxes, the combination of means for conveying the covers one after the other from a receptacle to the cover applying place, a device for applying the covers to the boxes, a feeding band for the boxes, said band having pockets for the boxes, means for removing those boxes from the box feeding band which have passed the cover applying device without having been provided with covers, said removing means consisting of a movable member disposed laterally of the box band and moving over each box pocket of the box band passing it and being, further, so arranged as to smoothly slide over the cover, if the box is provided with a cover, but to move down into the box and move said box towards the side away from the box band, if no cover has been applied to the box.

26. In machines for applying covers on boxes, the combination of means for conveying the covers one after the other from a receptacle to the cover applying place, a device for applying the covers to the boxes, a feeding band for the boxes, said band having pockets for the boxes, means for removing those boxes from the box feeding band which have passed the cover applying device without having been provided with covers, said removing means consisting of a movable member disposed laterally of the box band and moving over each box pocket of the box band passing it and being, further, so arranged as to smoothly slide over the cover, if the box is provided with a cover, but to move down into the box and move said box towards the side away from the box band, if no cover has been applied to the box, the said movable member consisting of an arm, being rotatable in the horizontal plane and turnable in the vertical plane and having a downwardly directed part passing over the pockets.

In testimony whereof we affix our signatures.

PER NORDENFELT.
EDVARD FRISK.